March 30, 1954  F. RAPER  2,673,478
ALIGNING FIXTURE
Filed Jan. 22, 1951

INVENTOR.
Foster Raper
BY
*A. C. Karel.*
ATTORNEY

Patented Mar. 30, 1954

2,673,478

UNITED STATES PATENT OFFICE 2,673,478

ALIGNING FIXTURE

Foster Raper, Covington, Ky.

Application January 22, 1951, Serial No. 207,195

1 Claim. (Cl. 77—63)

My invention relates to a fixture adjustable on the table of power driven rotary spindle machines for aligning the work and preventing rotation of the work when operated upon by a rotary spindle.

Many accidents occur in industry when machining small parts on spindle machines due to the work holding to the spindle and rotating therewith, however, with my improved aligning fixture which can be positioned in any desirable relation to the work spindles, the work is held against the fixture and prevented from rotating with the spindle.

The object of my invention is to provide a guide for a power driven rotary spindle machine which is adjustable on the table of the machine and is provided with adjustable guides to support the work at any desired position along the main rail.

My invention will be further readily understood from the following description and claim, and from the drawings in which latter, Fig. 1 is a plan view of a portion of a rotary spindle machine tool with my improved fixture mounted thereon.

Figure 1:
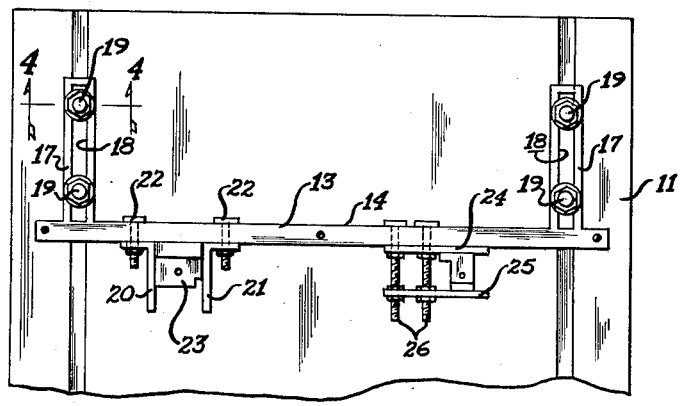
Figure 2:
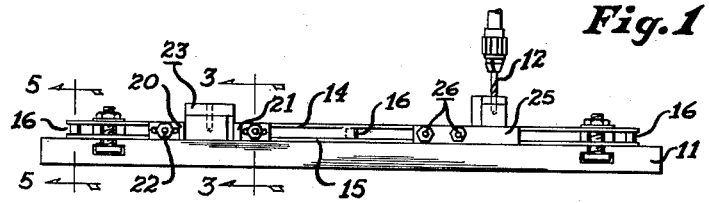
Fig. 2 is a front view of the same.
Figure 3:
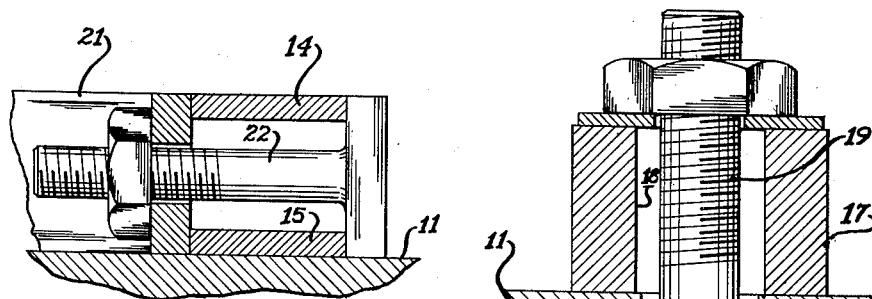
Fig. 3 is a detailed section, taken in the plane of the line 3—3 of Fig. 2.
Figure 4:
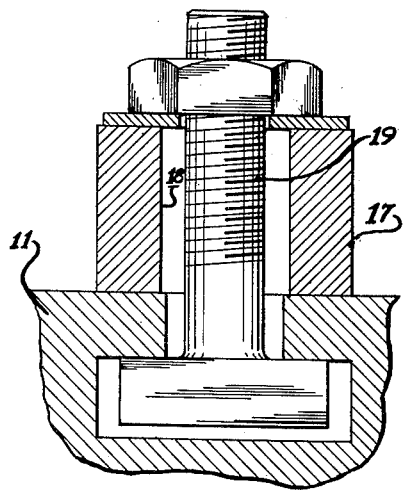
Fig. 4 is a detailed section, taken in the plane of line 4—4 of Fig. 1.
Figure 5:
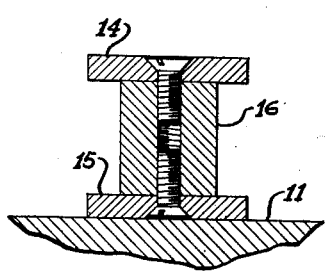
Fig. 5 is a detailed section, taken in the plane of the line 5—5 of Fig. 2.

My improved aligning fixture is adapted to be secured to the table of the machine tool which is provided with rotary spindles 12. The fixture comprises a main rail 13 comprising an upper plate 14 and a lower bar 15 suitably secured together by spaced spacers 16. The main rail 14 has a pair of rearwardly extending arms 17 with elongated slots 18 for reception of suitable T bolts for bolting the fixtures to the table. On such tables as are not provided with T slots suitable bolts extend through the slots 18 and are threaded into the table bed for holding the fixture on the table or if it is desired to place the fixture in an angular position on the table only two bolts are used to hold the fixture to the table.

I have shown a pair of extending angle members, 20 and 21, which are bolted to the main rail 13 as by bolts 22 to form guides for the insertion of the particular work piece 23 which it is desired to operate upon. These angular members can be moved to any desired position along the rail for reception of the work therebetween. I have also shown a modified form of guide wherein the work is received between a pair of plates 24 and 25 which are suitably spaced on bolts 25 which in turn are secured to the rail 13.

With my improved work holder small pieces of work can be aligned with the rotary spindle of the machine for mass production of small parts. The fixture is readily adjustable and can be adjusted to accommodate work pieces of various sizes and shapes readily and quickly with a minimum amount of effort to provide a safe holding arrangement for the work.

Having thus fully described my invention, what I claim as new, and desire to secure by Letters Patent, is:

In combination with a machine tool table, an aligning fixture comprising a pair of rectangular guide bars provided with rearward extensions, spaced spacers between said bars, T slots in said table, bolts extending upwardly from said slots for attaching said extensions to said table, bolts extending between said pair of bars for rigidly attaching a plurality of work positioning members longitudinally to said bars.

FOSTER RAPER.

References Cited in the file of this patent

UNITED STATES PATENTS

| Number | Name | Date |
|---|---|---|
| 2,480,885 | Sedlock | Sept. 6, 1949 |